(12) United States Patent
Johnson et al.

(10) Patent No.: US 6,360,338 B1
(45) Date of Patent: *Mar. 19, 2002

(54) ENHANCED INSTRUMENTATION SOFTWARE IN FAULT TOLERANT SYSTEMS

(75) Inventors: Charles S. Johnson; Larry W. Emlich; Paul Komosinski, all of San Jose; Robert W. Lennie, Sunnyvale, all of CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/377,390

(22) Filed: Jan. 24, 1995

(51) Int. Cl.[7] .............................................. G06F 13/00
(52) U.S. Cl. ............................ 714/49; 714/47; 714/15; 714/25
(58) Field of Search ........................ 395/184.01, 182.13, 395/182.02, 182.01; 714/15, 25, 26, 16, 47, 48, 49

(56) References Cited

U.S. PATENT DOCUMENTS 5,095,421 A * 3/1992 Freund ........................ 395/650
5,440,726 A * 8/1995 Fuchs et al. ............. 395/82.18

* cited by examiner

Primary Examiner—Norman M. Wright
(74) Attorney, Agent, or Firm—Leah Sherry Oppenheimer Wolff & Donnelly

(57) ABSTRACT

A monitor function is implemented to monitor and control service processes and other system entities that perform tasks on a distributed network. The monitor function tracks the demise and instantiation of processes and entities that either export or import instrumentation. Any service process or other system entity (driver, interrupt handler, system library procedure) can export instruments (indicators, controls, testpoints). Instrument updates are propagated automatically if they are significant. The importing process conveys the information to a management system so that a human operator, or automated system, can observe and control the operation of the network service. One aspect of the invention uses a backup exporter to take over the processing of an exporter that has become nonfunctional. Another aspect of the invention determines when a CPU has gone down and acts accordingly to identify service processes that were associated with an exporter in the down CPU. For each exporter in the down CPU, any importer that was monitoring with the exporter must perform a switchover to monitor instrumentation on the new exporter in a fault tolerant manner. Additional methods are disclosed which implement fault tolerant monitoring and control in a distributed network.

1 Claim, 7 Drawing Sheets

ENHANCED INSTRUMENTATION SOFTWARE IN FAULT TOLERANT SYSTEMS

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

This invention deals generally with software in fault tolerant systems and specifically with fault tolerant instrumentation software for monitoring multiple processes in a distributed multi-processing network.

Monitoring and control of data plays an important role in today's computer systems. Especially where large computer systems deal with large amounts of information, as in, for example, a distributed transaction-based data base system, the ability to receive information from any of a number of processes that make up the data base service and the ability to control or otherwise affect the operation of the service processes has advantages. One advantage is, that the system can be selectively monitored by a human or an automated management system such as another computer system. Another advantage is that the operation of the system can be affected in real time without bringing the system to a halt to load in and execute modified software to implement the services or processes.

Monitoring and control of software in real time is also referred to as "instrumenting" the software being executed.

FIG. 1 shows a generalized computer network 10 that includes several processors such as processor 12, processor 14, etc. Each processor typically includes a central processing unit (CPU), random access memory (RAM), disk drive, etc. In the generalized computer network of FIG. 1, the processors may be any type of processor or computer system as is commonly known in the art. The processors typically execute software to perform tasks. The software can be thought of in terms of singular "processes" and are shown as circles within the processor rectangles such as process 22 within processor 16. A process such as process 22 may be an operating system process, application program process, etc. and can perform tasks such as math computations, data base manipulation, communication task, etc. In today's distributed networks, processes can be split up over several processors so that multi-processing takes place. For example, process 22 can be part of a graphics-rendering task in which processes 24, 26 and 28 are also participating. Thus, in a distributed multi-processor network, it is often irrelevant where a certain process is executing.

Processes can communicate with other processes by sending messages over the network. For example, in FIG. 1, message 30 is being transferred over network 32 from process 22 to process 28. The processes reside, respectively, on processor 16 and processor 20. Message 30 may be, for example, a packet of data if the generalized network 10 is a packet switch network.

In FIG. 1, network 32 may be any type of network. Further, the interconnections between processors may be by hardwire, radiowave, fiber optic, or other types of connections. The ability of processes on different processors to communicate quickly and efficiently over network 32 is very important toward realizing an efficient distributed network.

A processor, such as processor 20 in FIG. 1, may have specific hardware attached to it to perform tasks such as interfacing with a human. Processor 20 is shown to have a display 32 and keyboard 34 for performing, respectively, output and input to a human user. Such devices are useful, for example, to allow a human to monitor and control whatever tasks are being performed by the various processors and processes attached to network 32. One example of a task or "service" is a distributed data base system where multiple users at multiple processors can be connected to multiple other processors for purposes of accessing a data base that resides on storage media connected to the network. In FIG. 1, it is assumed that each processor has some of its own resources, such as RAM and other storage media. However, typically a network will provide shared resources such as a large disk array that can be accessed by any of the processors in turn.

Where processor 20 is executing a process, such as process 28, to implement a monitoring and control function so that a user operating keyboard 34 and viewing display 32 can receive information on, and transfer information to, various processes in the network, it is, naturally, important that the monitoring and control function be accurate and reliable. In traditional systems, it is a simple matter to ensure that monitoring and control is implemented reliably if it is acceptable for a failure of one or more of the components in generalized network 10 to cause a halt in the monitoring and/or control activity.

For example, assuming process 28 is monitoring process 22 so that process 28 receives information from process 22 in the form of messages such as message 30 sent, from time to time, from process 22 to process 28. Under normal operation, process 28 would receive messages containing information on the state or status of process 22 and display this information to a user on display 32. Also, messages can be transferred in the other direction from process 28 to process 22 in response to a user's input at keyboard 34. The messages from the monitoring and control process 28 to the monitored and controlled process 22 could change the way process 22 operates.

If a failure occurs, such as processor 16 being rendered inoperable, process 22 would cease to transmit messages and would also cease to receive and act upon messages. For such a failure is not catastrophic to the operation of the network, or service provided by the network system, such a failure of processor 16, and inability of process 22 to communicate, would eventually be detected. Once detected, process 28 could simply be directed to cease communications with process 22. Alternatively, another process could be launched on a different processor to duplicate the task formally performed by process 22. Then, process 28 could resume communications with the substitute process. However, note that this might mean messages have been lost between process 28 and process 22 since processor 16 may have failed after process 28 had sent a message and before process 22 had received it. Also, the failure of processor 16 may mean that a message that should have been generated by process 22 and transmitted to process 28 was never generated or received by process 28. In systems where fault tolerance is not important, this is not a problem. However, a problem arises in distributed processing in network systems that are performing services where loss of communications and other data faults are not acceptable. An example of a system where fault tolerance is required is transaction processing in a data base system where the transactions are financial.

Therefore, it is desirable to have a system that monitors and controls a software service while providing fault tolerance.

SUMMARY OF THE INVENTION

A first aspect of the invention discloses a method for providing fault tolerant monitoring and control in a distributed processing network. The network includes a plurality of computer systems executing a plurality of service processes that cooperatively perform a function. Monitored processes and exporter processes exchange messages.

An exporter process sends messages to a monitored process about the state of one or more service processes. The exporter process receives messages from the monitored process and transfers information to one or more controlled service processes. The method includes the steps of: receiving with the monitored process, a message that a first process is disabled; in response to the receiving step, performing the following steps in the monitored process; identifying each of the monitored service processes; identifying each of the controlled service processes; instantiating a new exporter process; and for each of the identified service processes, assigning the identified service process to the new exporter process.

DESCRIPTION OF THE PREFERRED EMBODIMENT

The system of the present invention is embodied in a commercial product known as Tandem Instrumentation Facility (TIF). A copy of the relevant portions of TIF Software is included as Microfiche Appendix A to this specification. Also included in Appendix B is an explanation of some of the relevant routines of the source code Appendix A. Where specific routine names are mentioned, e.g., "TifMon," Appendix A should be consulted for more details on the routine.

Figure 2:
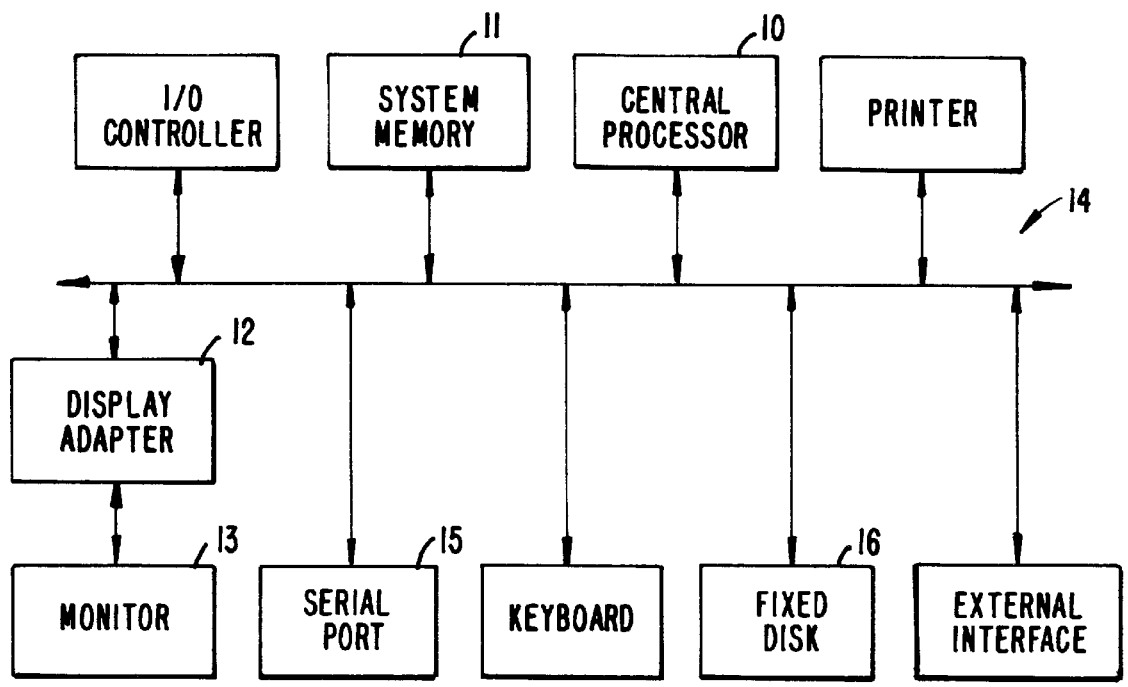
FIG. 2 is an illustration of basic subsystems in the computer system of FIG. 1.

FIG. 2 is an illustration of basic subsystems in a computer system suitable for use with the present invention. In FIG. 2, subsystems are represented by blocks such as central processor 10, system memory 11, display adapter 12, monitor 13, etc. The subsystems are interconnected via a system bus 14. Additional subsystems such as a printer, keyboard, fixed disk and others are shown. Peripherals and input/output (I/O) devices can be connected to the computer system by, for example serial port 15. For example, serial port 15 can be used to connect the computer system to a modem or mouse input device. The interconnection via system bus 14 allows central processor 10 to communicate with each subsystem and to control the execution of instructions from system memory 11 or fixed disk 16, and the exchange of information between subsystems.

Figure 1:
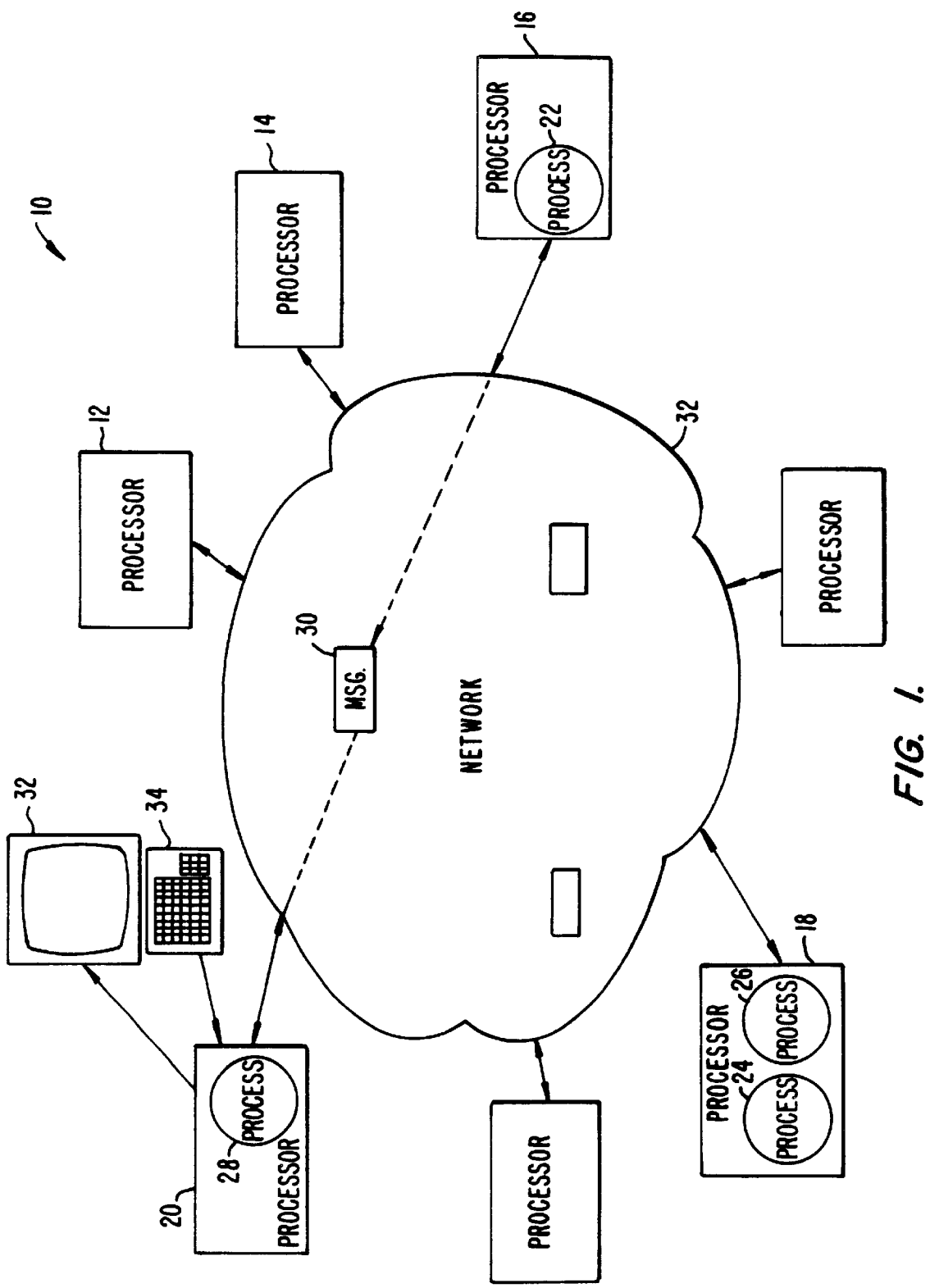
FIG. 1 shows a generalized computer network.

The computer system of FIG. 2 corresponds to a processor in FIG. 1. However, a processor such as shown in FIG. 1 may include more or less subsystems than the computer system of FIG. 2. The computer system of FIG. 2 may be connected to a network via the serial port, a parallel port (not shown) or by other means. FIG. 2 is merely a representation of the types of subsystems in a computer system and other arrangements of subsystems and interconnections are possible.

Figure 3:
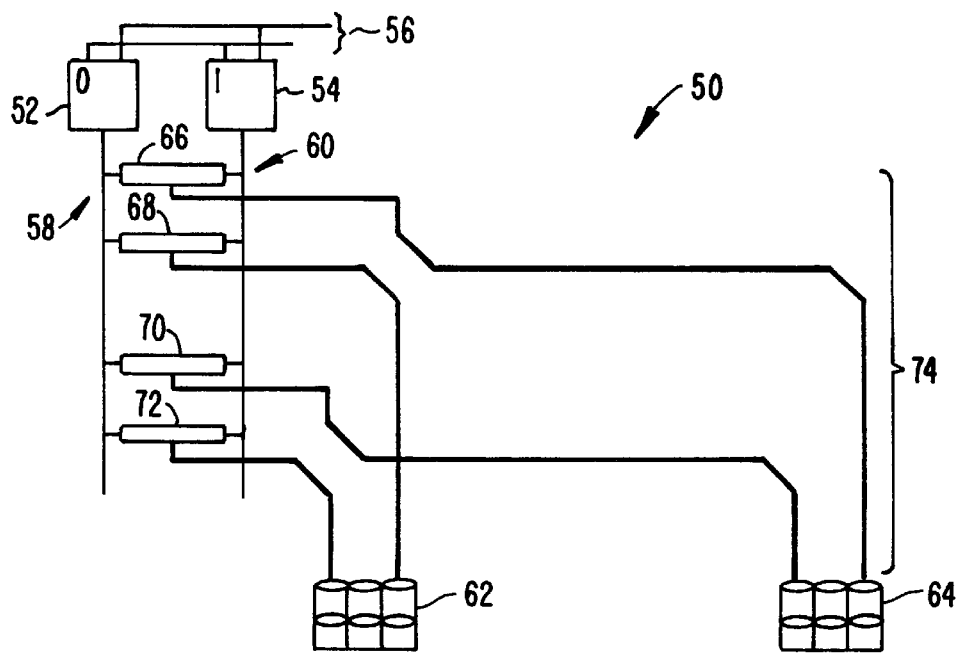
FIG. 3 is a block diagram of a data processing system that implements dual redundancy in its architecture.

FIG. 3 is a block diagram of a data processing system that implements dual redundancy in its architecture and is representative of a system architecture that would be better suited for use with the present invention rather than the general computer system of FIG. 2. In FIG. 3, computer system 50 includes first and second CPUs 52 and 54 coupled by an Interprocessor BUS (IPB) 56. First and second data busses 58 and 60 are coupled to the I/O ports of CPUs 52 and 54 and to disc storage units 62 and 64 via disc controllers 66–72 and cables 74. For a description of fault tolerant computer system architecture design see, e.g., U.S. Pat. No. 4,228,496.

Figure 7:
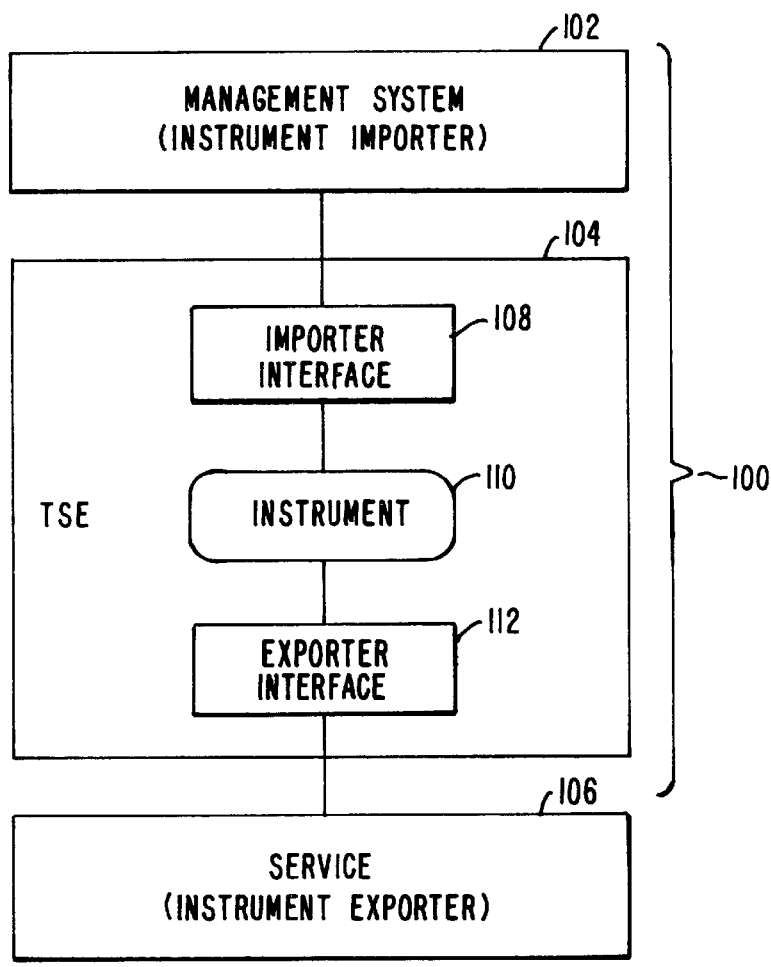
FIG. 7 shows a block diagram of software processes used to achieve the fault tolerant monitoring and control of software in the present invention.

FIG. 7 shows a block diagram of software processes used to achieve the fault tolerant monitoring and control of software in the present invention.

The monitoring and control design of the present invention centers around the concept of an "instrument." An instrument is a mechanism to asynchronously obtain data from, or transfer data to, a process performing some task in an application. For example, in a distributed data base that performs transactions over a network, various processes will perform functions such as searching, retrieving, storing, sorting, etc. with information in the database. A monitoring agent process (TifMon) mediates the exchange of instrumentation information between all exporting processes (and other exporting entities) and all of the importing processes (TifServes) which reside in the same cpu as the monitoring agent process. An importer process mediates the exchange of instrumentation information between the entire instrumented system and a system which manages it. These various processes are described below.

Any entity in the system can be an exporter of instrumentation, including a system service process. An exporter of instrumentation which is actively being monitored propagates the instrument reports to an agent (TifMon) in the cpu where the importer process (TifServe) resides. That agent distributes the instrument reports to all importer processes in that cpu. The monitoring agent process in the importing cpu receives messages from the operating system about the state of all exporters. The method includes the steps of: receiving in the importer process, a message that an exporting first process is disabled; in response to the receiving step, performing the following steps in the importer process; identifying the new exporter process; identifying each of the instruments monitored in the old exporter process; and for each of the identified instruments, assigning the identified instrument to the new exporter process, and instantiating the monitoring of that instrument there.

There are three basic instrument types, namely, test point, indicator and control. A test point inserts logic at a selected point in a service process to perform a function. A Test point can be used to perform almost any function that is typical of computer systems. An indicator is used to show the value of a variable used in a service process. A control is used to show the value of a variable and allows changes to be made to the variable within the service process.

Services export instruments to the monitoring agent process. In the preferred embodiment, the monitor process executes within a TIF Support Environment (TSE). A management system is any software package that imports instruments from TIF and presents them to a human or automatic manager. Therefore, management systems import instruments from the TSE. An instrument, from a programming standpoint, is an object in memory. The TSE provides services to create, find, examine and modify instrument objects.

Returning to FIG. 7, management system 102, TSE 104 and a service process 106 are shown. Management system 102 and TSE 104 perform the monitor function 100 of monitoring and controlling a service process such as service 106. The functional blocks in FIG. 7 that represent software processes, can be related to the diagram of FIG. 1. Service 106 of FIG. 7 is a process such as process 22 in FIG. 1. Monitor function 100 includes management system 102 and TSE 104 and would be executing on a processor such as processor 20 as process 28 of FIG. 1.

Management system 102 can implement, for example, a graphical user interface so that a human user may efficiently observe and control various aspects of the operation of a network system.

TSE 104 includes importer interface 108, instrument 110 and exporter interface 112. Each of these are processes executing within a computer system that is performing a monitor function. Importer interface 108 provides mechanisms to discover, monitor, sense and modify instruments from within a computer system on which it executes. An importer typically discovers lists of instruments associated with a particular service and monitor selected instruments from that list. Instrument 110 represents instrument structures in global memory within the computer system performing monitor function 100. Static controls and indicators maintain instrument values in the memory of the computer system. Dynamic controls and indicators use procedures to derive values on request.

Within the computer system performing the monitor function, test points always perform some predefined action or launch a dynamic procedure. All test point procedures return a value for evaluation or monitoring. Both the exporter interface and importer interface use common instrumentation services to propagate instrument values and get information about instruments.

Exporter interface 112 provides mechanisms to service 106 for instantiating instruments in memory; updating and reading controls and indicators; and executing test point logic. If an instrument modification is considered "significant" and there is at least one interested importer, the new instrument state is propagated to the cpus containing those interested importers.

Thus, while FIG. 7 shows only a single importer 108 and exporter 112, in practice, there can be many importers 108 and exporters 112 resident within the computer system performing the monitor function. Moreover, importers and exporters can be distributed as the monitor function, itself, can be distributed over multiple computer systems.

Any entity in the system can export instruments, and be an exporter: system service processes, user processes, drivers, interrupt handlers, modules and even single procedures. Exporting entities will typically include one or more calls to the exporter's interface application program interface (API) for each instrument declared by them. They also include instrument declarations which are extracted and processed by the off-line component of TIF to simplify the task of adding instruments.

Figure 8:
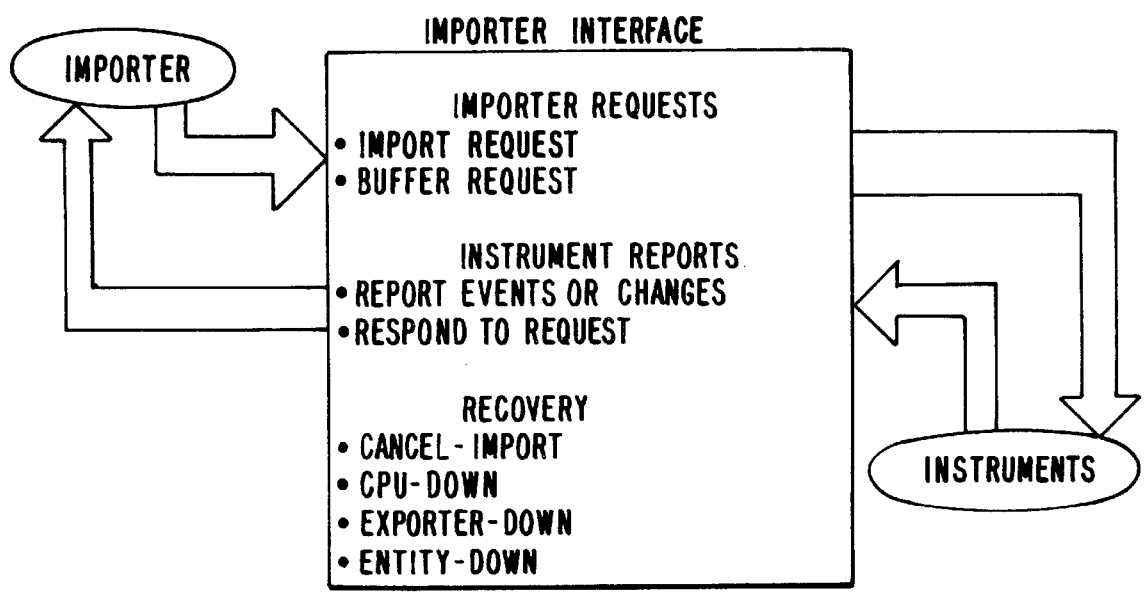
FIG. 8 is a diagram showing types of communication between the instrument process and importer interface of FIG. 7.

FIG. 8 is a diagram showing types of communication between the instrument process 110 and importer interface 108 of FIG. 7. As shown in FIG. 8, the importer may make requests in the form of messages to declare interest in specific instruments or to import a buffer of instrument reports from those specific instruments. In response to these requests, the instrument process reports on events or changes and provides the requested data.

Figure 9:
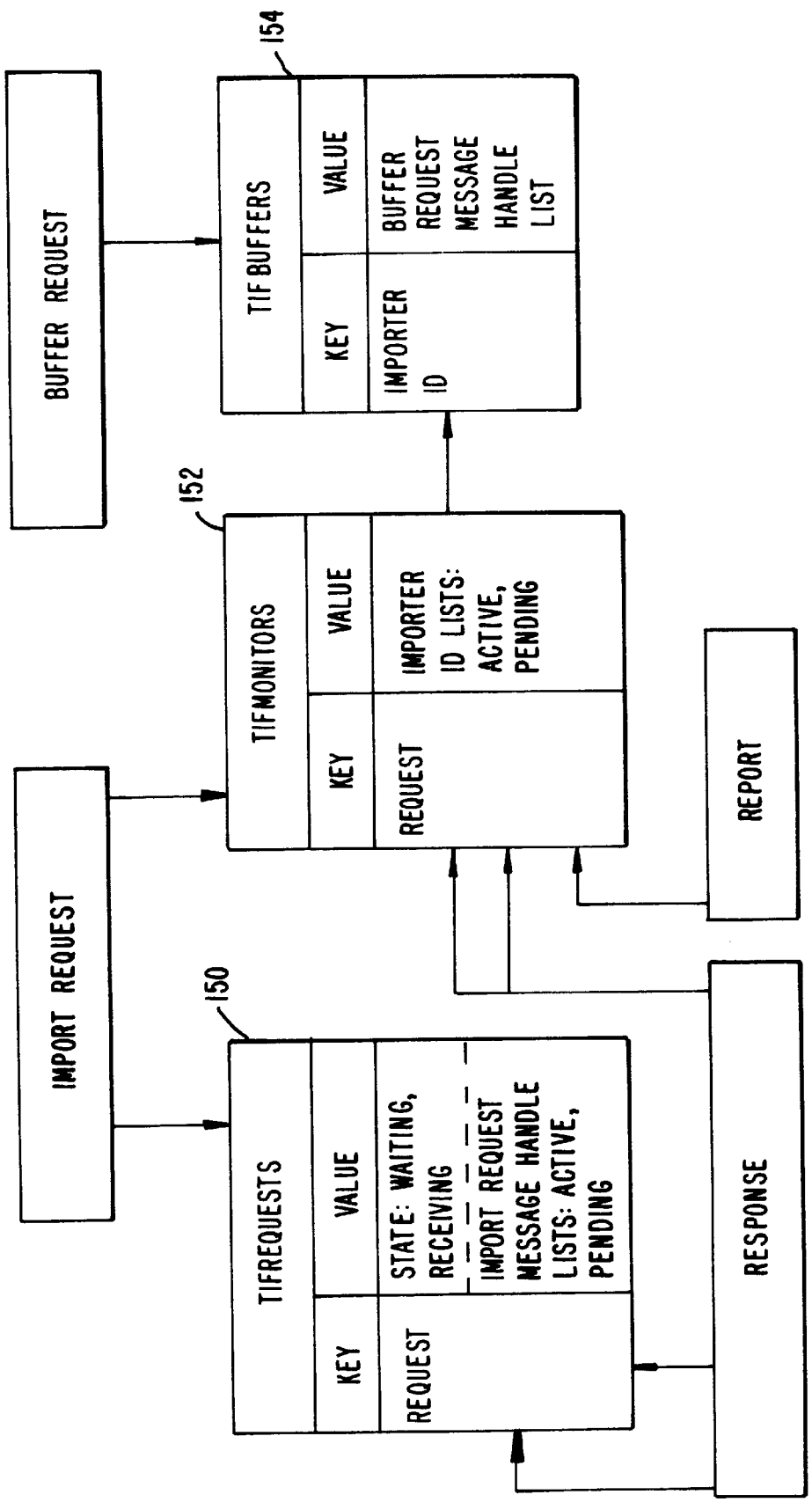
FIG. 9 shows basic data structures used in the monitor function.

FIG. 9 shows basic data structures used in the monitor function. Specifically, when an importer process sends an import request, the data structures 150 and 152 of FIG. 9 are returned. These data structures, namely, TifRequests and TifMonitors include information on managing the communication of messages between the importer process and the instrument process and provide data as shown in FIG. 9. Similarly, when the importer sends a buffer request, data structure 154 is returned, including information, such as a handle list where a handle is an identifying number for a process, such as a server process. As discussed below, service processes are associated with other processes and the monitor function, such as importer and exporter processes.

Figure 4:
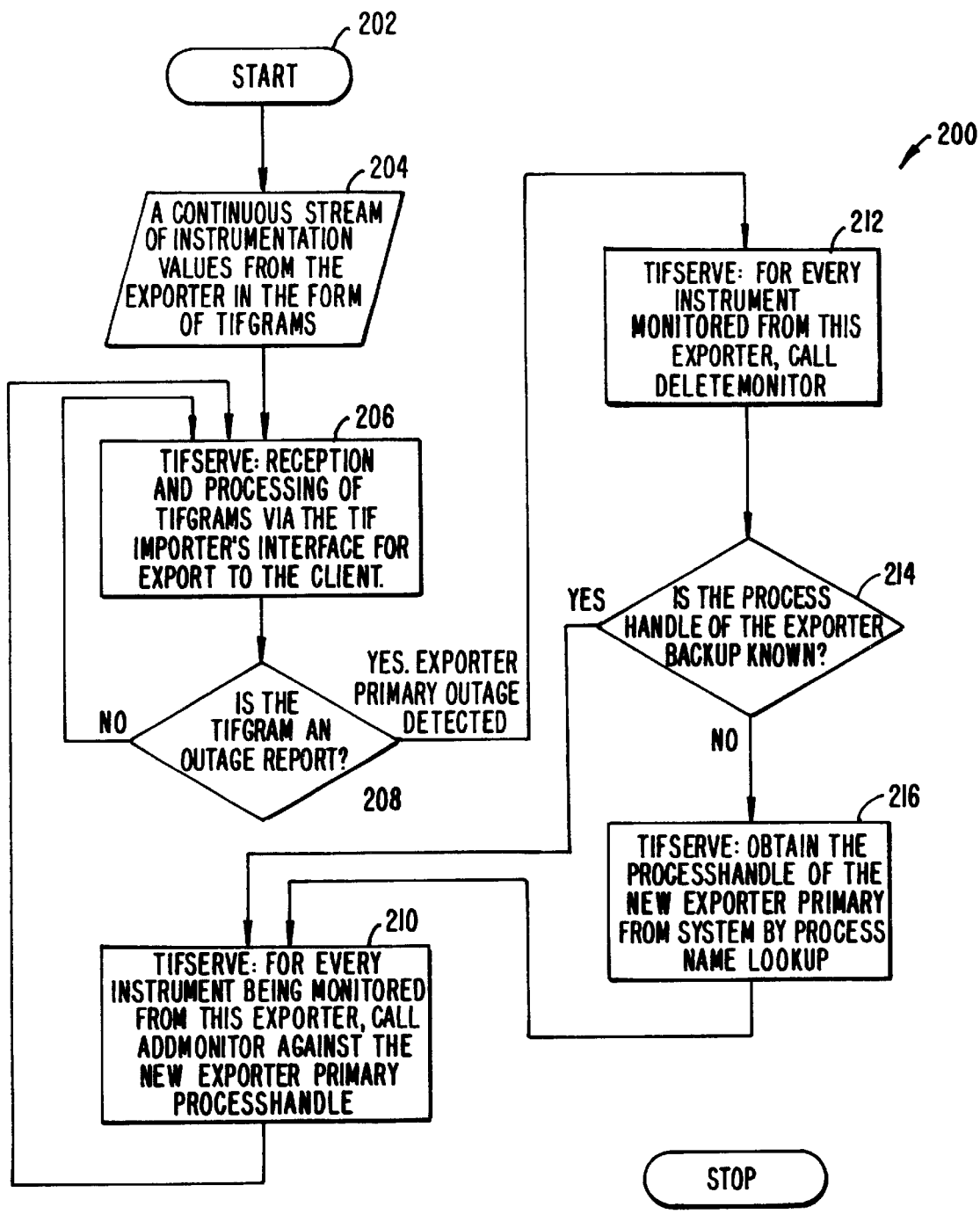
FIG. 4 shows a flowchart for a method for remapping monitoring after an exporting service process has been disabled.
Figure 5:
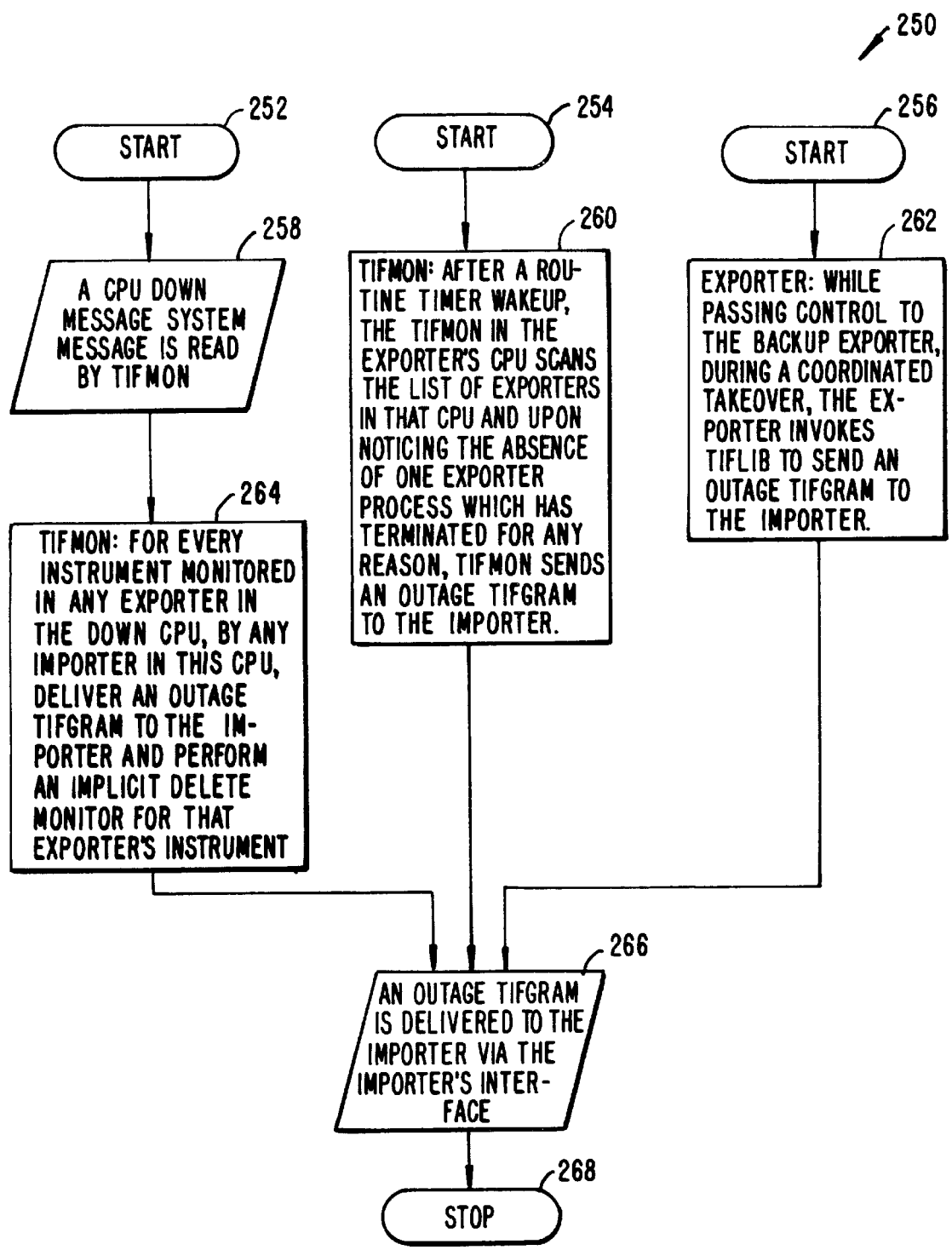
FIG. 5 shows a flowchart for a method for generating an outage notification for a monitored service process.
Figure 6:
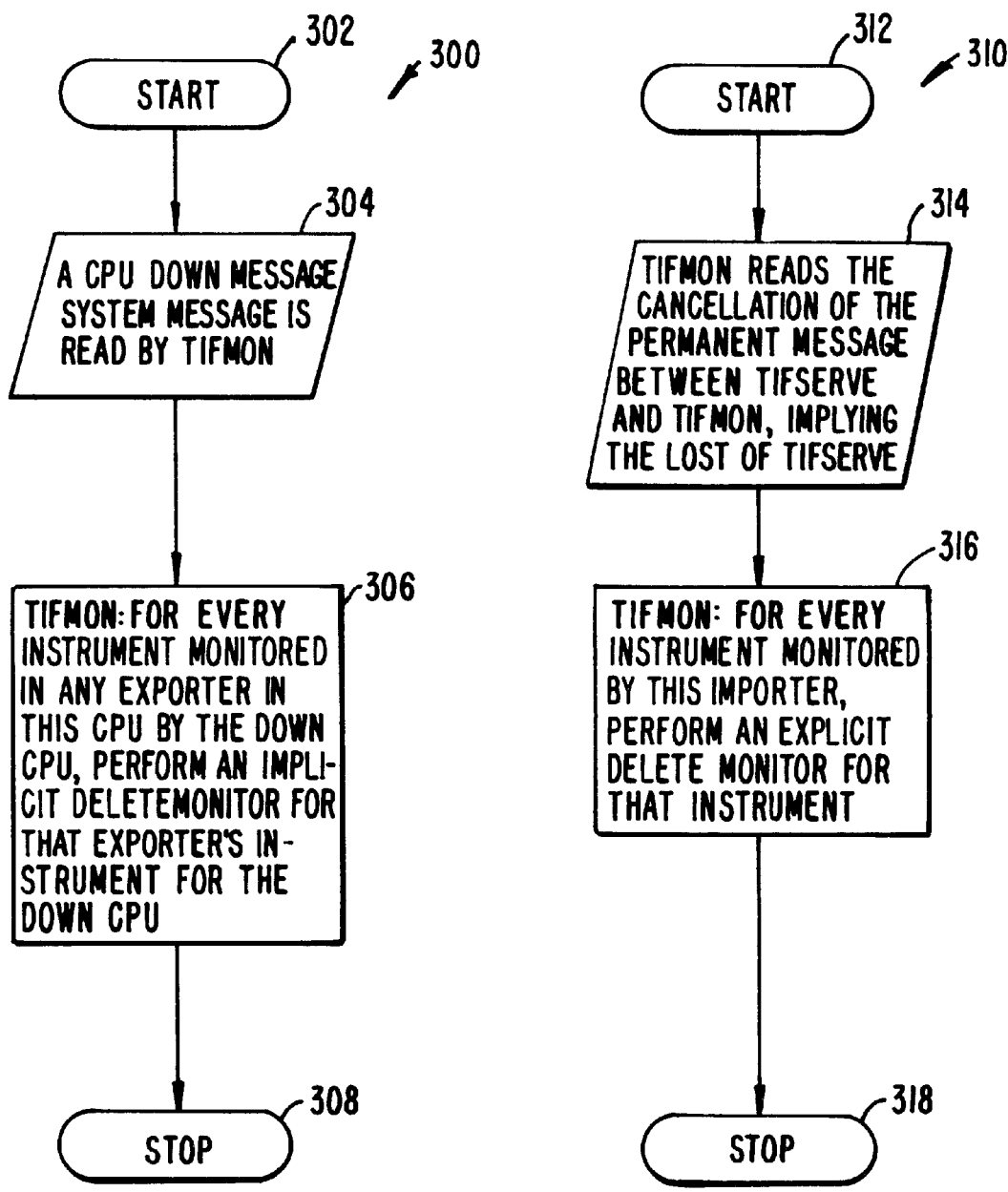
FIG. 6 shows flowcharts relating to methods for maintaining the integrity of a monitoring function during component failures.

Next, FIGS. 4–6 are discussed to describe three flowcharts relating to methods for performing monitoring functions in a fault-tolerant manner. In general, the flowcharts in this specification illustrate one or more software routines executing in a computer system such as the computer systems FIGS. 2 or 3 coupled by a network as shown in FIG. 1. The routines may be implemented by any means as is known in the art. For example, any number of computer programming languages, such as "C", Pascal, FORTRAN, assembly language, etc., may be used. Further, various programming approaches such as procedural, object oriented or artificial intelligence techniques may be employed.

The steps of the flowcharts may be implemented by one or more software routines, processes, subroutines, modules, etc. It will be apparent that each flowchart is illustrative of merely the broad logical flow of the method of the present invention and that steps may be added to, or taken away from, the flowcharts without departing from the scope of the invention. Further, the order of execution of steps in the flowcharts may be changed without departing from the scope of the invention. Additional considerations in implementing the method described by the flowchart in software may dictate changes in the selection and order of steps. Some considerations are event handling by interrupt driven, polled, or other schemes. A multiprocessing or multitasking environment could allow steps to be executed "concurrently." For ease of discussion the implementation of each flowchart is referred to as if it is implemented in a single "routine".

The source code in Appendix A should be consulted in connection with the flowchart descriptions for a more detailed understanding of the system of the invention and the preferred embodiment.

FIG. 4 shows flowchart 200 that provides steps in a method for remapping monitoring after an exporting service process has been disabled. In practice, an exporting service process may become disabled for various reasons. One reason is that the processor, or CPU, that was executing the service process has malfunctioned. Other reasons may be that the service process has been terminated by another process or by a decision of the operating system within which the service process is executing. The routine of flowchart 200 is entered at step 202 when the monitoring function of the present invention is started. Step 204 is executed to receive a continuous stream of instrumentation values from one or more exporter processes performing the monitoring function. Next, execution proceeds to step 206 where reading buffers of instrument values, in the form of TifGrams, is performed by an importer process before being sent to the management system. The function of receiving and processing instrumentation values and sending the processed values to the management system is part of the monitoring process so that a human manager, or automated manager, receives information about the, service executing on the network.

Next, step 208 is executed to check whether any received message is an "outage" report. An outage report is an indication that a service process that is being monitored or controlled has been disabled. If the message is not an outage report, execution proceeds to step 206 where subsequent messages received at step 204 are processed.

However, if, at step 208, a message is determined to be an outage report, execution proceeds to step 212. Since the outage report indicates that a given exporter, step 212 flags each instrument monitored by the nonfunctional exporter as disabled within the monitor function. Since other exporter processes may be instantiated on different computer systems and may be exporting some of the same instruments that the nonfunctional exporter was exporting, these deletion messages are sent to all monitor functions that may be executing on different computer systems.

Next, a check is made at step 214 as to whether the process handle of the exporter backup is known. In a preferred embodiment, each exporter process has a backup that is instantiated yet dormant on one or more processors. This backup process can be invoked instantly if it exists and is known by the monitoring function, that is, the recipient of the outage report.

If the process handle of the exporter backup is known, execution proceeds to step 210 where each instrument being monitored by the nonfunctional exporter is added to the exporter backup process which has been newly activated and has now become the primary exporter for these instruments. However, if, at step 214, there is no exporter backup process handle known, execution diverts to step 216 where a new exporter primary is instantiated. Then, as before, step 210 is executed to convey all of the instrument monitoring functions to the new exporter.

Execution again returns to step 206 where the stream of instrumentation values is processed as discussed above.

FIG. 5 shows a flowchart 250 that describes a method for generating an outage notification for monitored service process.

In FIG. 5, flowchart 250 can be entered at three different steps, 252, 254 and 256, depending on one of three predetermined events. Step 252 is entered when a CPU down system message is read by the monitor function as indicated by condition 258. Next, step 264 is performed by every processor, or CPU, in the network. Each CPU in the network determines whether an importer process resides within that CPU's computer system where the importer receives messages from an exporter in the downed CPU. If so, every instrument monitored by the exporter in the downed CPU that communicates with the importer in the current CPU has its monitoring deleted. Next, the importer is notified of the exporter outage and the routine of FIG. 5 is exited at step 268.

The second event that would invoke flowchart 250 of FIG. 5 is dependent on a timed check. Step 254 is entered periodically when a timer "wake up" occurs. Step 260 is entered at each of these timer wake up intervals. For each CPU in the system, all of the exporters in a given CPU are scanned to try to detect an exporter process that is terminated for any reason. If such a terminated exporter is discovered, an outage report is sent to any importer associated with the terminated exporter. As before, step 266 is executed to disable the associated importers and the routine is exited at step 268.

Finally, the routine of flowchart 250 can be entered at step 256 for the condition indicated at step 262 which is when a primary exporter passes control to a backup exporter during a coordinated take over. In this case, the exporter causes an outage report to be sent to the importer. Step 266 indicates that such a message is sent to the importer to disable the importer and the routine is exited at step 268.

FIG. 6 shows two flowcharts, flowchart 300 and flowchart 310, that relate to methods for maintaining the integrity of the monitoring function during component failures.

In the foregoing specification, the invention has been described with reference to a specific exemplary embodiment thereof. It will, however, be evident that various modifications and changes may be made without departing from the broader spirit and scope of the invention as set forth in the appended claims. Many such changes or modifications will be readily apparent to one of ordinary skill in the art. The specification and drawings are, accordingly, to be regarded in an illustrative rather than a restrictive sense, the invention being limited only by the provided claims.

What is claimed is:

1. A fault tolerant monitoring and control system in a distributed processing network, wherein the distributed processing network includes a plurality of computer systems for executing a plurality of service processes which cooperatively perform a function across the plurality of service processes, comprising:

a plurality of export processes, wherein at least one export process is associated with each one of the plurality of computer systems;

a monitor process associated with the function being performed across the plurality of service processes which service processes run independently of the monitor process, the monitor process being coupled to receive messages from the plurality of export processes including messages from an export process about the state of one or more service processes performing the function, the monitor process also being coupled to send messages to the export process to control the plurality of service processes; and a control means for instantiating a new export process if a message is received that one or more of the service processes being monitored has failed.

* * * * *

UNITED STATES PATENT AND TRADEMARK OFFICE
CERTIFICATE OF CORRECTION

PATENT NO.    : 6,360,338 B1
DATED         : March 19, 2002
INVENTOR(S)   : Charles S. Johnson et al.

It is certified that error appears in the above-identified patent and that said Letters Patent is hereby corrected as shown below:

Column 2,
Line 44, reads: "and would also cease to receive and act upon messages. For" it should read:
-- and would also cease to receive and act upon messages. If --.

Column 6,
Line 36, reads: "systems FIGS. 2 or 3 coupled by a network as shown in FIG." it should read:
-- systems of FIGS. 2 or 3 coupled by a network as shown in FIG --.

Column 7,
Line 18, reads: "manager, receives information about the, service executing" it should read:
-- manager, receives information about the service executing --.

Signed and Sealed this

Tenth Day of December, 2002

JAMES E. ROGAN
*Director of the United States Patent and Trademark Office*